US006809669B1

(12) United States Patent
Robinson

(10) Patent No.: US 6,809,669 B1
(45) Date of Patent: Oct. 26, 2004

(54) SELECTIVE NOISE GENERATOR

(75) Inventor: Ian Robinson, Venice, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/756,650

(22) Filed: Jan. 13, 2004

(51) Int. Cl.[7] .............................................. H03M 1/20
(52) U.S. Cl. ...................... 341/131; 341/143; 341/144
(58) Field of Search .......................... 341/131, 143, 341/144, 155, 145, 120, 139, 118

(56) References Cited

U.S. PATENT DOCUMENTS

| | | | |
|---|---|---|---|
| 5,073,777 A | | 12/1991 | Fukuhara et al. |
| 5,463,689 A | | 10/1995 | Schutte et al. |
| 6,091,350 A | * | 7/2000 | Paulos et al. ............. 341/139 |
| 6,191,715 B1 | * | 2/2001 | Fowers ..................... 341/120 |
| 6,291,924 B1 | | 9/2001 | Lau et al. |
| 6,337,643 B1 | | 1/2002 | Gabet et al. |
| 6,744,392 B2 | * | 6/2004 | Melanson ................. 341/143 |

| | | | |
|---|---|---|---|
| 2002/0120457 A1 | | 8/2002 | Oliveira et al. |
| 2002/0136417 A1 | * | 9/2002 | Ku et al. ................. 381/94.1 |
| 2003/0179831 A1 | * | 9/2003 | Gupta et al. ............. 375/296 |

OTHER PUBLICATIONS

Shawn P. Stapleton, "High Efficiency RF Power Amplifers Using Bandpass Delta–Sigma Moudlators", Agilent Technologies, Inc., pp. 1–22.

* cited by examiner

*Primary Examiner*—Michael Tokar
*Assistant Examiner*—John B Nguyen
(74) *Attorney, Agent, or Firm*—Tarolli, Sundheim, Covell & Tummino L.L.P.

(57) ABSTRACT

System and methods are provided for selective noise generation. A delta-sigma modulator receives digital input and produces a digital output. A digital-to-analog converter converts the digital output into an analog output. The analog output comprises quasi-random noise having at least one low noise frequency band. The low noise frequency bands have respective associated shapes and center frequencies. A frequency control controls the delta-sigma modulator to alter one of the respective center frequency and the shape of the at least one low noise frequency band.

34 Claims, 6 Drawing Sheets

SELECTIVE NOISE GENERATOR

TECHNICAL FIELD

The present invention relates generally to communications systems, and more specifically to a noise generation system.

BACKGROUND OF THE INVENTION

Efforts in the design of integrated circuits for radio frequency (RF) communication systems generally focus on improving performance, reducing cost or a combination thereof. Some applications require the generation of random noise, referred to as white noise. White noise is produced indiscriminately across a frequency range, with each frequency within the range having an approximately equal level of noise power, subject to statistical deviations.

Amplifier linearity is often characterized by measuring the intermodulation distortion (IMD) products resulting from the input of two tones to an amplifier. A second test employs inputting a single modulated carrier and measuring the power that leaks into adjacent spectral channels. Comparing the wanted signal power to the leakage in adjacent channels is referred to as the Adjacent Channel Power Ratio, ACPR, test.

There are many applications where many carriers are required or where it is much more cost effective to amplify multiple signals with a single amplifier. The tests for IMD and ACPR may not indicate an amplifier's performance when many signals are input. It is difficult to generate a large number of input signals because the test apparatus can easily generate intermodulation products, which will then be amplified and taint results measured at the output.

One application of a noise generation assembly lies in component testing. A commonly used test to characterize multi-carrier power amplifiers is called the Noise Power Ratio (NPR) test. The NPR test loads an amplifier with broadband noise except for a "notched" quiet region in which the level of signal is measured. The broadband noise is a surrogate for a large number of carrier signals. If the amplifier is perfectly linear then the noise will be amplified but there will be no signal "leakage" into the notched region. The level of signal present in the notched region when the loading is applied minus the level present with no loading indicates the degree of amplifier distortion. The Noise Power Ratio is the ratio of output power, measured in a bandwidth of interest, between the high noise and notched region. A mechanical filter that is configured manually for each test generally provides the notched region.

Linearity is a critical parameter for most transmitters because there is a significant cost impact both in components and input power to provide highly linear amplification. The consequence of non-linearities is distortion in wanted signals which may lead to received errors and unwanted or out-of-band emissions. These emissions can interfere with signals in a transmitter's band or with other systems and are strictly regulated by national and international regulations and standards.

A second application of noise generators is the jamming or interdiction of signals within a selected range of frequencies. A jamming signal attempts to overwhelm communications within its associated wideband frequency range by flooding the communications medium, such as cable, wire, or air, with noise. If not used judiciously, the jamming signal will indiscriminately affect both desired and undesired communications.

SUMMARY OF THE INVENTION

In accordance with one aspect of the present invention, a selective noise generation system is provided. A delta-sigma modulator receives digital input and produces a digital output. A digital-to-analog converter converts the digital output into an analog output. The analog output comprises at least one low noise or "quiet" frequency band and at least one frequency band of noise. The low noise frequency bands have respective associated shapes and center frequencies. A frequency control controls the delta-sigma modulator to alter one of the respective center frequency and the shape of the low noise frequency bands. The digital input can be approximately zero in which case it is not an information bearing signal or it can be designed to provide desired, information bearing signals within the "quiet" band.

In accordance with another aspect of the present invention, a method of selectively generating noise within a frequency range is provided. A digital input, having a first word size, is quantized to produce a digital output signal having a second word size. The first word size is larger than the second word size. The digital input is processed as to distribute noise associated with quantizing the digital signal across the frequency range, such that the quantization noise is spread across at least one frequency band of quasi-random noise and is substantiality reduced in at least one low noise frequency band having associated frequency characteristics. The quantized digital output signal is converted into an analog signal. The frequency characteristics of the at least one frequency band are altered.

DETAILED DESCRIPTION OF INVENTION

The present invention relates to systems and methods for selectively generating noise across a wide band of frequencies. The present invention takes advantage of the noise-shaping properties of high-speed delta-sigma modulators to generate random noise over wide bandwidths with low noise regions whose spectral location, width, and depth are controlled by digital filter functions, the number of bits in the output quantizer, and the clock rate. The parameters can be preset at the time the system is built or any (or all) can be made electronically selectable. For example, the center frequency and shape of one or more regions of low noise associated with the DAC can be altered at a central frequency control to allow for changing input frequencies.

Figure 1:
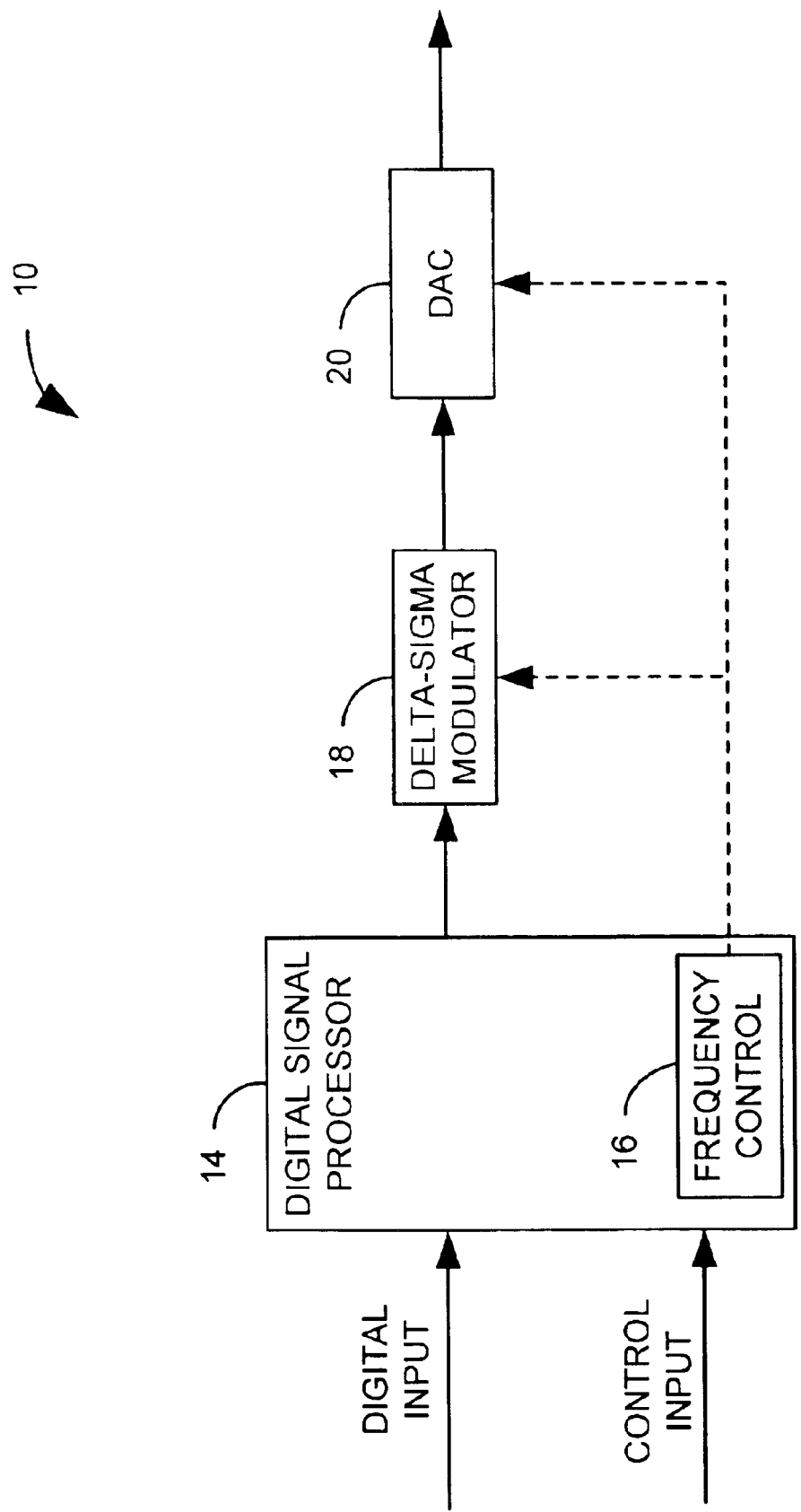
FIG. 1 illustrates a functional block diagram of a selective noise generator in accordance with one aspect of the invention.

FIG. 1 illustrates a selective noise generator 10 in accordance with one aspect of the invention. The selective noise generator 10 is operative to produce an analog output signal comprising a high-level of quasi-random noise and one or more low noise frequency bands. Within a low noise frequency band, the signal has a substantially lower noise power than in the surrounding signals. In accordance with one implementation of the selective noise generator 10, the noise power within the low noise frequency bands can be sixty or more decibels below the noise power at surrounding frequencies. The low noise frequency bands within the analog signal resemble notches within a wide band spectrum of noise.

The selective noise generator 10 receives one or more digital inputs at a digital signal processor 14. The digital inputs can include dither noise, which generates approximately a zero power output signal in the quiet band but which can ensure the delta-sigma modulator does not enter a disallowed state, and/or one or more information-carrying signals. The received inputs can be combined, filtered, or otherwise conditioned for transmission at the digital signal processor 14, as desirable for a given application. The digital signal processor 14 can be implemented as a microprocessor running customized software, a specialized digital or analog signal processor, or any of a number of other signal evaluation components.

The digital signal processor 14 also receives a control input that defines one or more low noise frequency bands for a desired analog output signal. The control input can comprise configuration input from an operator or frequency information can be passed to the frequency control from one or more components (not shown) upstream of the selective noise generator 10. The control input can be provided to a frequency control within the digital signal processor 14 that provides control signals to one or more components of the selective noise generator 10 in response to the control input. For example, the frequency control 16 is operative to select one or more frequency characteristics of at least one of a delta-sigma modulator 18 and a DAC 20 within the selective noise generator. For example, the frequency control can alter a characteristic center frequency or shape of one or more low noise frequency bands associated with the delta-sigma modulator 18.

The output of the digital signal processor is provided to the delta-sigma modulator 18 as a multi-bit input stream at a first sample rate. The delta-sigma modulator 18 converts the multi-bit input stream into an output stream at a second sample rate. The second sample rate can be selected according to desired frequency characteristics of an analog output signal associated with the system. The output stream is provided to a digital-to-analog converter (DAC) 20. The digital-to-analog converter 20 converts the digital output stream into one or more analog signals, each having a characteristic center frequency associated with the second sample rate.

In an exemplary embodiment, the characteristic center frequency is a radio frequency, such that the analog signal can be broadcast without any additional change in frequency. By radio frequency, it is intended to encompass the range of feasible transmission frequencies, including both traditional radio frequency (RF) ranges (e.g., megahertz range) and microwave frequency ranges (e.g., gigahertz range). The characteristic frequency can, however, be an intermediate frequency, requiring one or more upconverters (not shown) following the DAC 20 to convert the intermediate frequency signal to an appropriate frequency for transmission.

It will be appreciated that the output of the delta-sigma modulator will contain a considerable amount of quantization noise outside of the low noise bands. For example, a delta-sigma modulator transforming a twelve-bit output into a one-bit output will generate a large amount of quantization noise due to the coarseness of the quantization. The delta-sigma modulator 18 can distribute the generated noise across the frequency spectrum to provide an analog output comprising a desired frequency range of quasi-random noise. The delta-sigma modulator 18 is operative to maintain one or more low noise bands within the analog signal. These low noise frequency bands can be left vacant, or a desired signal can be placed within the frequency band, depending on the specific application of the noise generator.

The frequency control 16 can change clock rates associated with the delta-sigma modulator 18 and the DAC 20 to change the respective center frequencies of the one or more low noise frequency bands associated with the delta-sigma modulator 18 and the DAC 20. The center frequencies can be changed in real time, to allow the noise generator 10 to provide interdiction in communications systems utilizing frequency hopping and frequency division schemes. Similarly, the width and depth (e.g., dynamic range of the low noise bands can be altered electronically, to accommodate the usage of a number of communications protocols.

Figure 2:
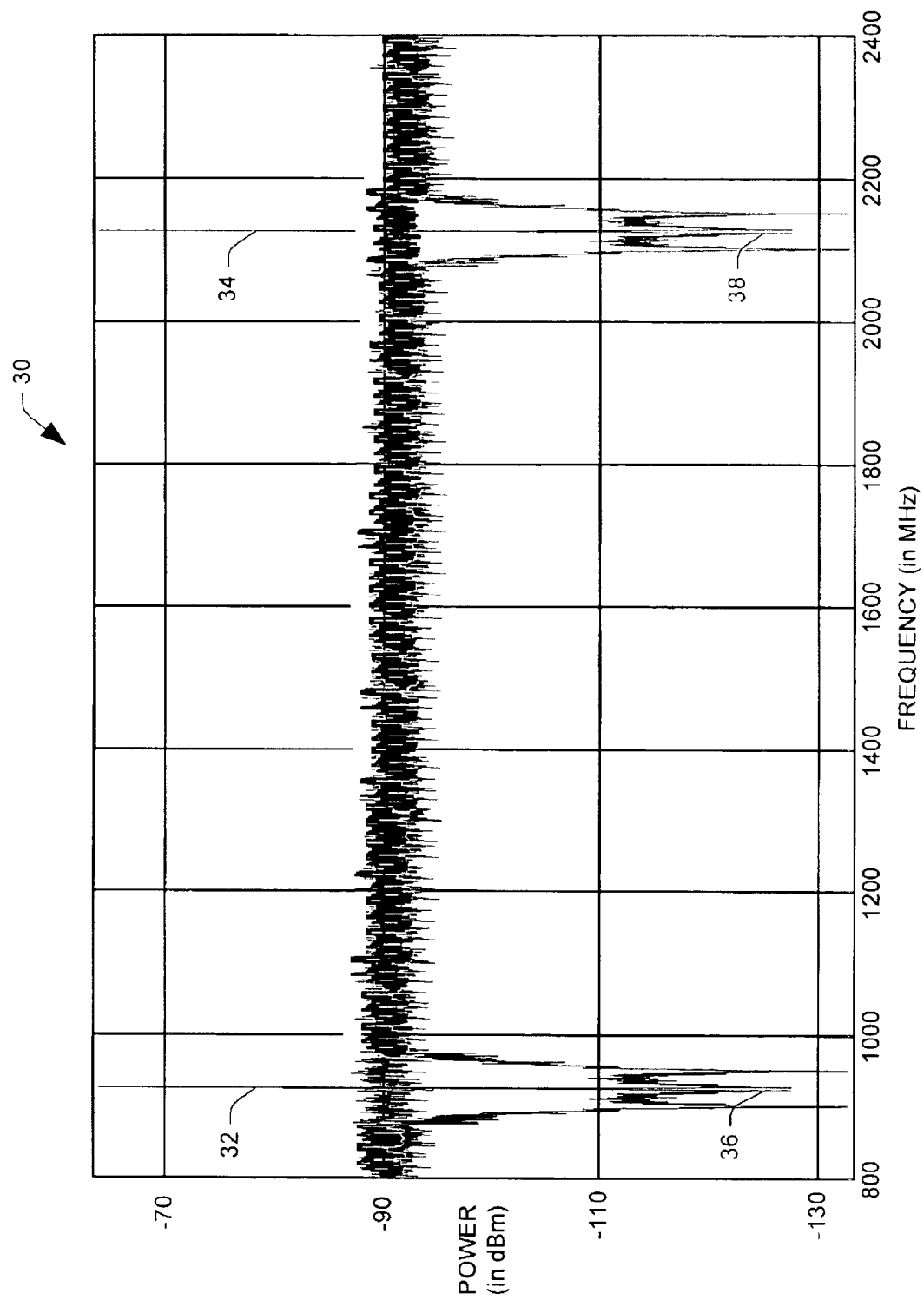
FIG. 2 is a graph of an analog output signal in which power is plotted as a function of frequency for the analog output of a selective noise generator implemented in accordance with an aspect of the present invention.

FIG. 2 is a graph 30 of an analog output signal in which power (dBm) is plotted as a function of frequency (MHz) for the analog output of a selective noise generator implemented in accordance with an aspect of the present invention. The analog output signal is shown at a first time as a first line 32 drawn in black and at a second time as a second line 34 drawn in gray. As mentioned previously, the selective noise generator can provide one or more very low noise regions (e.g., 36) of the spectrum, surrounded by wide ranges of quasi-random noise. The low noise regions can be selected to best test amplifier distortion or to allow communications that would otherwise be interdicted.

For example, at a first time, corresponding to the first line 32, the selective noise generator is used in conjunction with a transmitter operating in a GSM band. For this example, a low noise region 36 associated with the analog signal is centered at about 940 MHz. The low noise region 36 extends for a bandwidth ranging from about 30 MHz to about 100 MHz around the center frequency, with the remaining bandwidth being filled with a relatively high level of noise. Such a signal can be utilized, for example, to provide a wanted signal to one or more intended receivers while blocking undesired communications. The center frequency of the low noise band can be changed, such that the transmitter may be operated in a WCDMA frequency band. The resulting signal corresponds to the second line 34. Thus, a low noise region 38 associated with the signal is now centered at about 2135 MHz. It will be appreciated that the change in center frequency can be performed rapidly to continually change the location of the low noise band, allowing providing extra security in a desired communication. It will further be appreciated, that the width and power of the low noise region can also be changed in accordance with the present invention.

Figure 3:
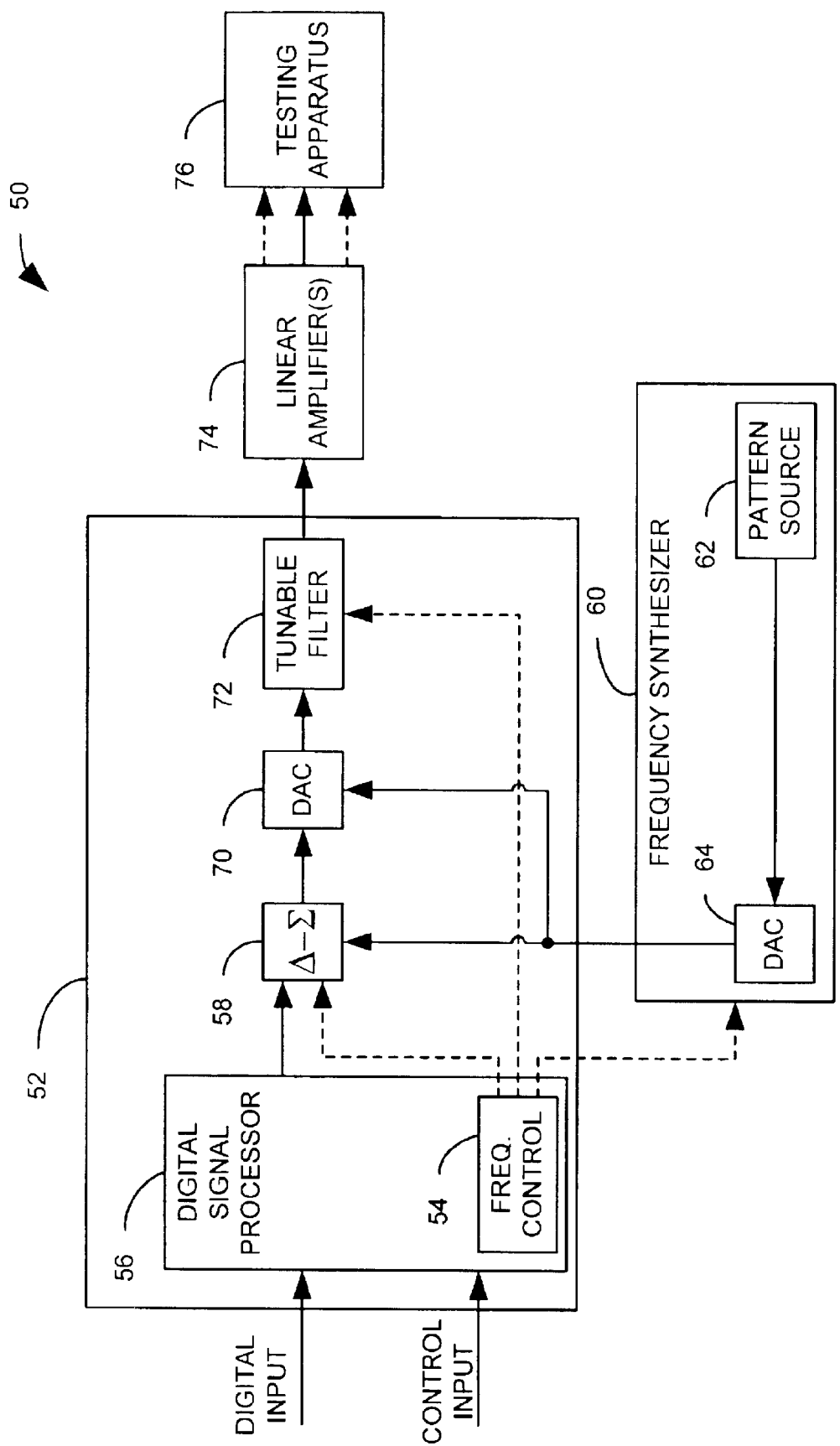
FIG. 3 illustrates a functional block diagram of an exemplary amplifier testing system incorporating a selective noise generator in accordance with an aspect of the present invention.

FIG. 3 illustrates an exemplary amplifier testing system 50 that utilizes a selective noise generator 52 in accordance with an aspect of the present invention. The illustrated selective noise generator 52 includes a frequency control 54, associated with a digital signal processor 56, that allows the selective noise generator 52 to produce any of a plurality of patterns of noise across the frequency spectrum by adjusting either the clock rate or values associated with one or more components. These changes can occur in real time, allowing the selective noise generator 52 to quickly provide a desired noise pattern for testing.

Turning to the operation of the illustrated system 50, one or more digital inputs are received at the digital signal processor 56. This digital input can include dither noise to facilitate the generation of a broadband white noise at the noise generator 52. The system 50 can also receive other digital inputs, for example, one or more baseband signals of interest. Any baseband signals so provided can be modulated with appropriate carrier signals at the digital signal processor 56. The signals are then passed to a delta-sigma modulator 58.

The delta-sigma modulator 58 can comprise one or more stages, limited only by practical considerations. The delta-sigma modulator 58 first preprocesses the digital input signal, as to shape the quantization noise produced by a quantization function of the delta-sigma modulator 58 into a desired noise pattern. In the illustrated example, the delta-sigma modulator 58 distributes the noise to a wide range of frequencies outside of one or more relatively narrow low noise frequency bands. The delta-sigma modulator 58 then quantizes the preprocessed digital signal to produce a digital output signal having a smaller word size.

The delta-sigma modulator 58 provides the one or more low noise frequency bands by shifting its associated quantization noise to frequencies outside of the low noise bands. The low noise frequency bands associated with delta-sigma modulator 58 for specific designs have center frequencies that are multiples of its clock rate. In an exemplary delta-sigma modulator, a center frequency of one low noise band can be found at one-fourth of the clock rate. Thus, the position of these low noise bands can be shifted across frequencies by changing the associated clock rate of the delta-sigma modulator 58.

To this end, the delta-sigma modulator 58 and DAC 70 can be driven by a clock signal provided by a frequency synthesizer 60. In the illustrated example, the frequency synthesizer 60 includes a source of one or more frequency patterns, indicated schematically at 62. The source 62 is operative to provide a selected frequency output signal as a function of a frequency selection signal provided by the frequency control 54. The frequency patterns can be sine waves or other waveform patterns, according to the configuration of the delta-sigma modulator 58. The selection signal contains a digital value that is associated with or maps to a corresponding frequency pattern. Those skilled in the art will understand and appreciate various mapping schemes and standards that can be employed to elicit desired frequency patterns from the source 62 based on the selection signal.

The source 62 can include memory (not shown) that stores digital representations of analog signal patterns having a predetermined duration (or length) for each of the desired frequencies. Those skilled in the art will understand and appreciate in applications where it may be suitable to employ a set of pre-stored frequency patterns in the source 62, the frequency patterns can be programmed offline for use during normal operation of the frequency synthesizer. Alternatively, the source 62 can be implemented as a digital signal processor (DSP) or other similar device capable of generating a digital representation of a signal having a desired frequency based on the selection signal. This approach allows any frequency to be used rather than a pre-stored set of frequency patterns. Alternatively, the clock signal for the delta-sigma modulator and the DAC may be generated in many other fashions not relying on stored patterns. The frequency synthesizer 60 can also include a digital-to-analog converter (DAC) 64 operative to convert a digital input waveform from the source 62 into a corresponding analog output signal.

Additional frequency characteristics associated with the digital output of the delta-sigma modulator 58 can be altered directly by the frequency control 54. Registers in one or more filter components within the delta-sigma modulator 58 can be programmable such that the scalar value associated with the register can be altered by a control signal from the frequency control 54. In the illustrated delta-sigma modulator 58, the registers contain digital filter coefficients. Altering these coefficients shifts the location of the zeros in the digital filter function represented by the delta-sigma modulator 58, changing the shape of the quantization noise across the frequency spectrum. Specifically, the width and dynamic range of a given low noise band can be changed by shifting the number of and the placement of the one or more zeroes along the frequency spectrum The output of the delta-sigma modulator 58 is then provided to a digital-to-analog converter 70. The digital-to-analog converter 70 produces an analog output signal that corresponds to the digital output of the delta-sigma modulator 58. The digital-to-analog converter 70 can also be driven by the frequency synthesizer 60, such that it operates at a rate corresponding to the rate of the delta-sigma modulator 58. It is to be appreciated, that if the noise generator is not required to provide information bearing signals in the low noise regions then pre-stored patterns of delta-sigma modulated inputs may be transmitted to the digital-to-analog converter 70.

The analog output signal is then provided to an optional filter 72 which may be a tunable (or selectable) filter. The filter 72 regulates the bandwidth of the analog signal. The filter 72 attenuates signals having a frequency outside of one or more passbands associated with the filter. The filter passbands have respective center frequencies and associated widths, and the width and center frequency of each passband can be altered in response to a control signal from the frequency control 54. This allows the noise generator 52 to provide a signal having noise over a selected band of the spectrum.

The filter 72 can be implemented as a tunable filter comprising a bank of filters, each representing a desired passband of interest. Alternatively, the filter 72 can comprise a surface acoustic wave (SAW) filter that can electronically controlled to configure one or more micromechanical components that define its one or more associated passband frequencies. Other tunable filters having similar frequency agility can be utilized in accordance with one or more aspects of the invention. The output of the filter 72 is an analog test signal having a desirable noise spectrum for testing.

The analog test signal is then provided to a bank of one or more amplifiers 74 under test. In some applications a highly linear amplifier providing higher signal power may be needed between the DAC and the amplifiers 74 under test. The one or more linear amplifiers 74 amplify the analog output signal, and the respective output of the one or more amplifier 74 is provided a testing apparatus 76. In the illustrated example, the output of the one or more linear amplifiers 74 is analyzed to characterize the linear properties of the amplifiers. As discussed above, the signal from the noise generator 52 comprises one or more wide bands of noise, punctuated by one or more comparatively narrow low noise bands, referred to as notches.

The testing apparatus 76 measures the mean signal power and/or power spectral density in the notch band and the adjacent regions with and without the analog signal input loading the amplifier. The apparatus compares signal level in the notch region with and without loading to determine the signal power that "leaks" into the narrow band due to the wide band noise. The ratio of the power in the adjacent band(s) to the leakage signal, referred to as the Noise Power Ratio (NPR), provides a measure of the linearity of the one or more amplifiers 74. The relationship of the NPR to the linearity of the amplifier and various testing apparatus for determining the ratio are known in the art, and one skilled in the art will appreciate that various implementations of the testing apparatus are possible.

The illustrated testing system 50 can also be used to simultaneously provide NPR testing across a notched region and intermodulation distortion testing or adjacent channel power ratio (ACPR) testing within the notched region. This implementation leverages the ability of the illustrated noise generator 52 to insert baseband signals, modulated appropriately by the digital signal processor 56, into the delta-sigma modulator 58 and DAC 70 and provide RF output signals. The test signals can include one, two or more tones or modulated carriers within a low noise region, while the amplifier is loaded with broadband noise across the remainder of its bandwidth. The broadband noise simulates the presence of many other carriers for the purposes of the intermodulation distortion testing. The use of the delta-sigma modulator 58 in combination with the DAC 70 to convert the carrier signals ensures the level of distortion in the carriers will be low. The addition of carriers within the notch region provides information not available from traditional NPR testing including the impact of amplifier non-linearity on specific wanted signal and increased information on unwanted or out-of-band emissions.

Accordingly, the testing apparatus 76 can comprise components for simultaneously conducting NPR testing and intermodulation distortion or ACPR testing to assess the impact of the many carriers on one or a few test carriers. Measuring the error in the modulation of the test carriers, especially if one is added at a time, provides insight into AM-AM and AM-PM distortions as a function of amplifier loading and carrier spacing. The power of the test carriers can be varied to differentiate additive errors from those inherent in the carriers after amplification. Using the tunable filter 72, the same test carriers can be examined in the absence of the broadband noise. Noise can be incrementally added by gradually widening the passband of the filter. The ability of the present invention to relocate both the notch region and any carriers enables rapid retesting of an amplifier across its applicable spectral band. It also enables the present invention to be used to test amplifiers designed to operate over a wide range of frequencies without requiring a large number of mechanical filters.

Figure 4:
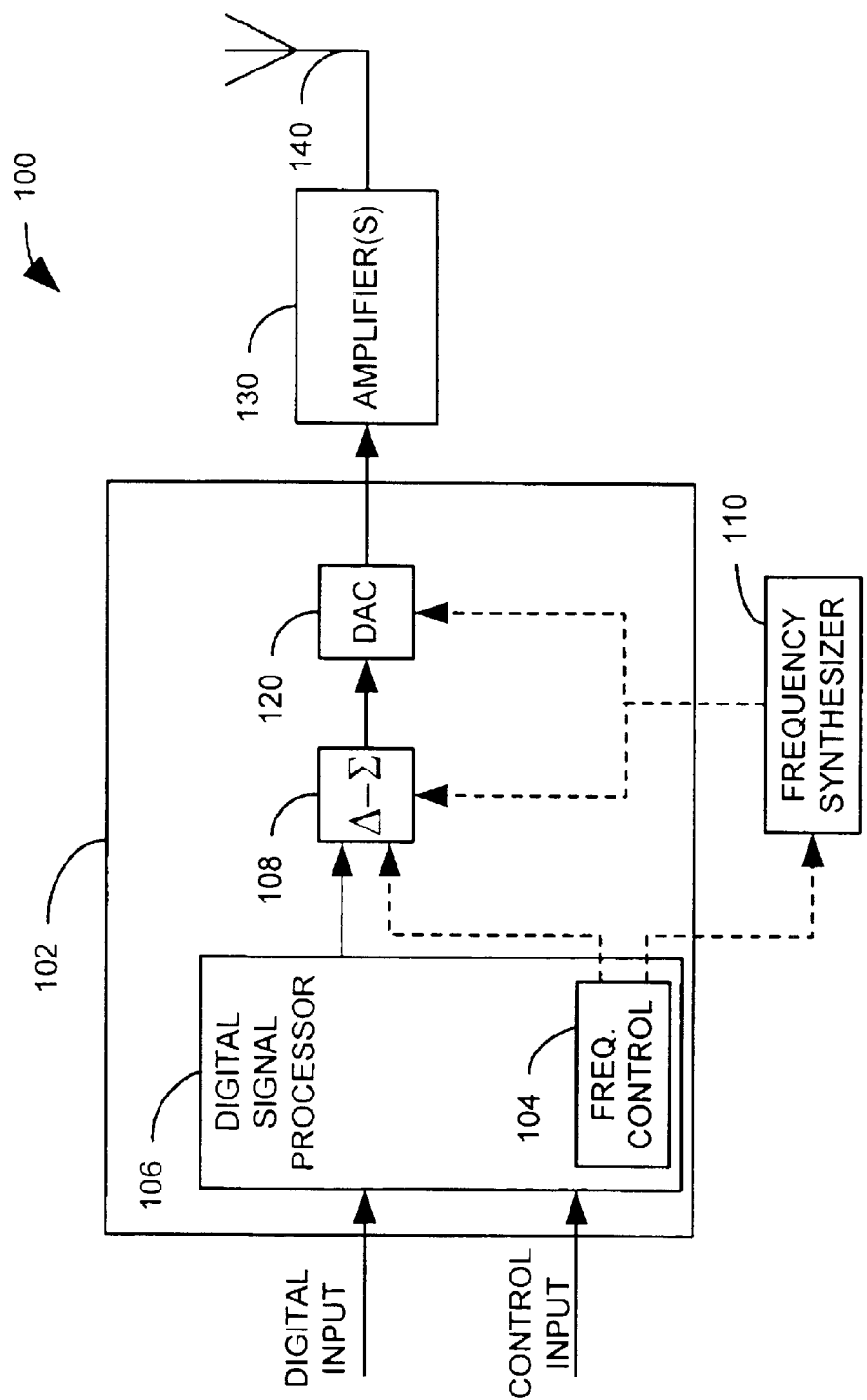
FIG. 4 illustrates a functional block diagram of an exemplary transmitter system incorporating a selective noise generator in accordance with an aspect of the present invention.

FIG. 4 illustrates an exemplary transmitter 100 utilizing a selective noise generator in accordance with an aspect of the present invention. The illustrated transmitter is operative to provide a broad spectrum of quasi-random noise to interdict undesired communications, while providing one or more low noise regions for desired communications. The illustrated selective noise generator 102 includes a frequency control 104, associated with a digital signal processor 106, that allows the selective noise generator 102 to produce low noise regions across the frequency spectrum by adjusting either the clock rate or values associated with one or more components. Frequency characteristics of the noise generator can be changed in real time, allowing the selective noise generator 102 to quickly provide a desired noise pattern for testing. The system can rapidly re-locate or hop the quiet, low noise regions to provide the user a communications system that will resist jamming from other sources as well as low probability of intercept.

Turning to the operation of the illustrated transmitter 100, one or more digital inputs are received at the digital signal processor 106. This digital input can include dither noise to facilitate the generation of a broadband white noise at the noise generator 102. Unless the transmitter 100 is intended solely for jamming undesired signals, the system can also be provided with one or more baseband signals of interest. Any baseband signals so provided can be modulated with appropriate carrier signals at the digital signal processor 106. The signals are then passed to a delta-sigma modulator 108.

The delta-sigma modulator 108 can comprise one or more stages, limited only by practical considerations. The delta-sigma modulator 108 first preprocesses the digital input signal, as to shape the quantization noise produced by a quantization function of the delta-sigma modulator 108 into a desired noise pattern. In the illustrated example, the delta-sigma modulator 108 distributes the quantization noise to a wide range of frequencies outside of one or more relatively narrow low noise frequency bands. The delta-sigma modulator 108 then quantizes the preprocessed digital signal to produce a digital output signal having a smaller word size which can have a higher sample rate. The sample rate of the digital output signal can be selected to correspond to a desired analog output frequency of the noise generator 102.

The delta-sigma modulator 108 provides the one or more low noise frequency bands by shifting its associated quantization noise to frequencies outside of the low noise bands. The low noise frequency bands associated with delta-sigma modulator 108 can be designed to have center frequencies that are multiples of its clock rate. In an exemplary delta-sigma modulator, a center frequency of one high dynamic range band can be found at one-fourth of the clock rate. Thus, the position of these low noise bands can be shifted across frequencies by changing the associated clock rate of the delta-sigma modulator 108.

To this end, the delta-sigma modulator 108 can be driven by a digital frequency synthesizer 110, for example, a frequency synthesizer similar to that described above in FIG. 3. The digital frequency synthesizer 110 is controlled by the frequency control 104 to achieve a desired clock rate for the delta-sigma modulator 108. It will be appreciated that the frequency control 104 can be made responsive to user input, such that the respective center frequencies of the one or more low noise regions are programmable.

Additional frequency characteristics associated with the digital output of the delta-sigma modulator 108 can be altered directly by the frequency control 104. Registers in one or more filter components within the delta-sigma modulator 108 can be programmable such that the scalar value associated with the register can be altered by a control signal from the frequency control 104. In the illustrated delta-sigma modulator 108, the registers act as digital filter coefficients. Altering these coefficients shifts the location of the zeros in the digital filter function represented by the delta-sigma modulator 108, changing the shape of the quantization noise across the frequency spectrum. Specifically, the width and dynamic range of a given low noise band can be changed by shifting the number of and the placement of the one or more zeroes along the frequency spectrum.

The output of the delta-sigma modulator 108 is then provided to a digital-to-analog converter (DAC) 120. The DAC 120 produces an analog output signal that corresponds to the digital output of the delta-sigma modulator 108. The DAC 120 can also be driven by the frequency synthesizer 110, such that it operates at a rate corresponding to the rate of the delta-sigma modulator 108. The sample rate of the digital output from the delta-sigma modulator 108 can be selected to correspond to a desired radio frequency, such that the analog signal from the DAC 120 is output at a radio frequency. Accordingly, the output of the DAC 120 can be transmitted without further upconversion. By radio frequency, it is intended to encompass the range of feasible transmission frequencies, including both traditional radio frequency (RF) ranges (e.g., megahertz range) and microwave frequency ranges (e.g., gigahertz range).

The analog signal is provided to a bank of one or more amplifiers 130 that amplify the signal to provide a signal suitable for transmission at an antenna 140. If the delta-sigma modulator and DAC provide single-bit quantization the resulting binary signal is well suited to highly efficient amplification using switching amplifiers130. Switching amplifiers (e.g., class D, E, F, or S) can operate at very high efficiency, exceeding ninety percent in some situations. Alternatively, other types of amplifiers can be utilized. For example, linear amplifiers (class A, A/B, or B) or a class C amplifier can be used to trade distortion of the signal at the low noise regions for power efficiency.

The signal broadcast at the antenna 140 contains a wide band of quasi-random noise and one or more comparatively narrow low noise frequency bands. This allows the transmitter 100 to deny uncooperative or hostile receivers a receptive environment while providing or enabling wanted signals in selectable and changeable spectral bands. The low noise region can be more than sixty dB below the noise level of surrounding frequencies, and any of a number of communications signal types can be supported within the one or more low noise regions. Wanted signals can be supplied to the delta-sigma modulator 108 and provided simultaneously with the broadband noise or the low noise regions can be utilized by external communications systems.

It will be appreciated that the low noise regions provided by the noise generator 102 can be repositioned at extremely high rates. A transmitter operating according to a frequency hopping scheme can greatly reducing the chance that wanted signals will be detected and/or intercepted. The above-described transmitter has applications for law enforcement, homeland security, or private security organizations by jamming unauthorized, terrorist, or criminal wireless communications channels while leaving a selectable, easily changed portion of spectrum for legitimate commutations. The present invention supports communications over waveguides (e.g. cable) or via wireless means. Denying media broadcast signals over air or waveguide to non-paying customers is another viable application of the present invention. The present invention can supplement or replace encryption techniques.

Figure 5:
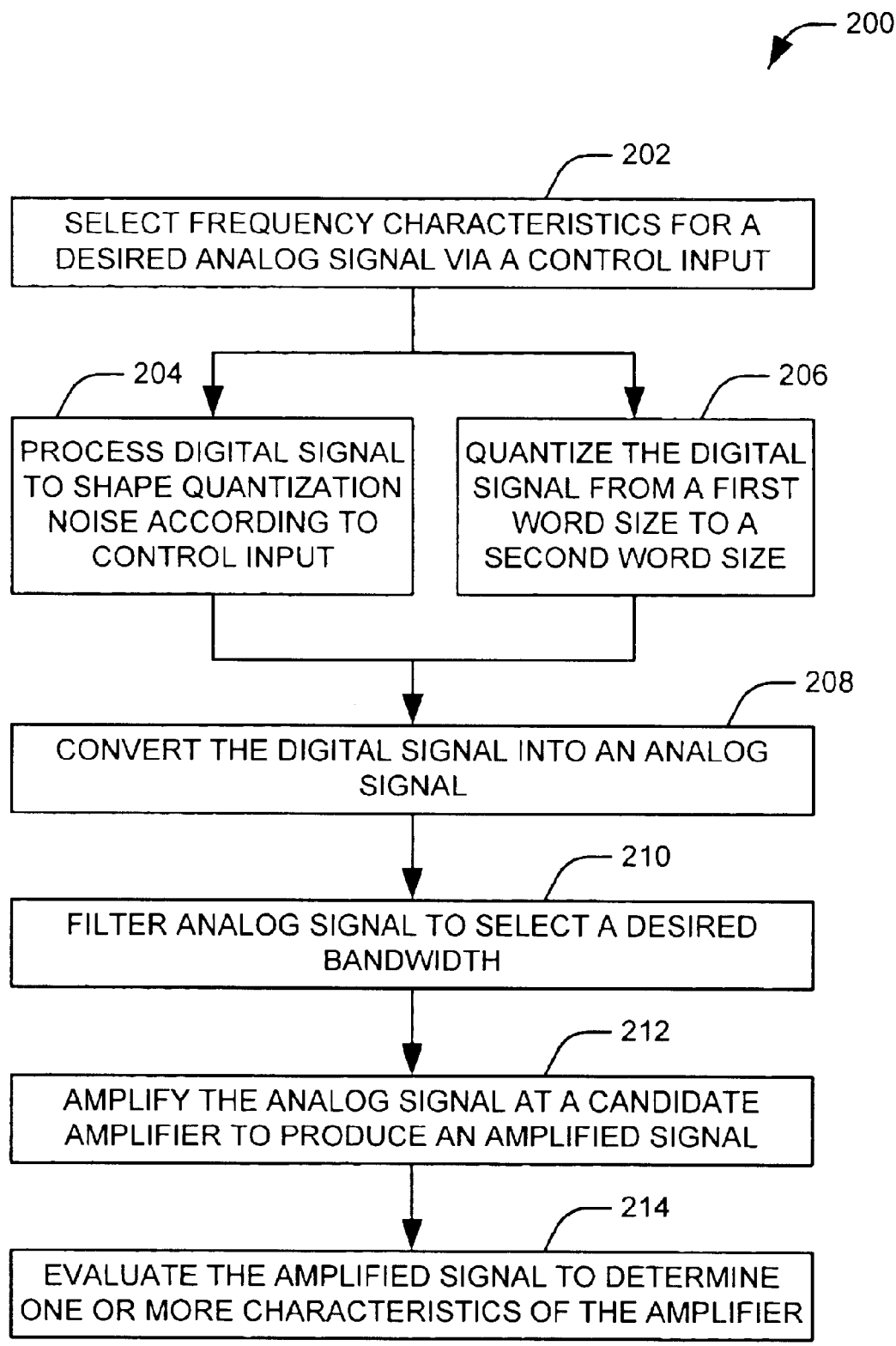
FIG. 5 illustrates a method for evaluating one or more characteristics of an amplifier.
Figure 6:
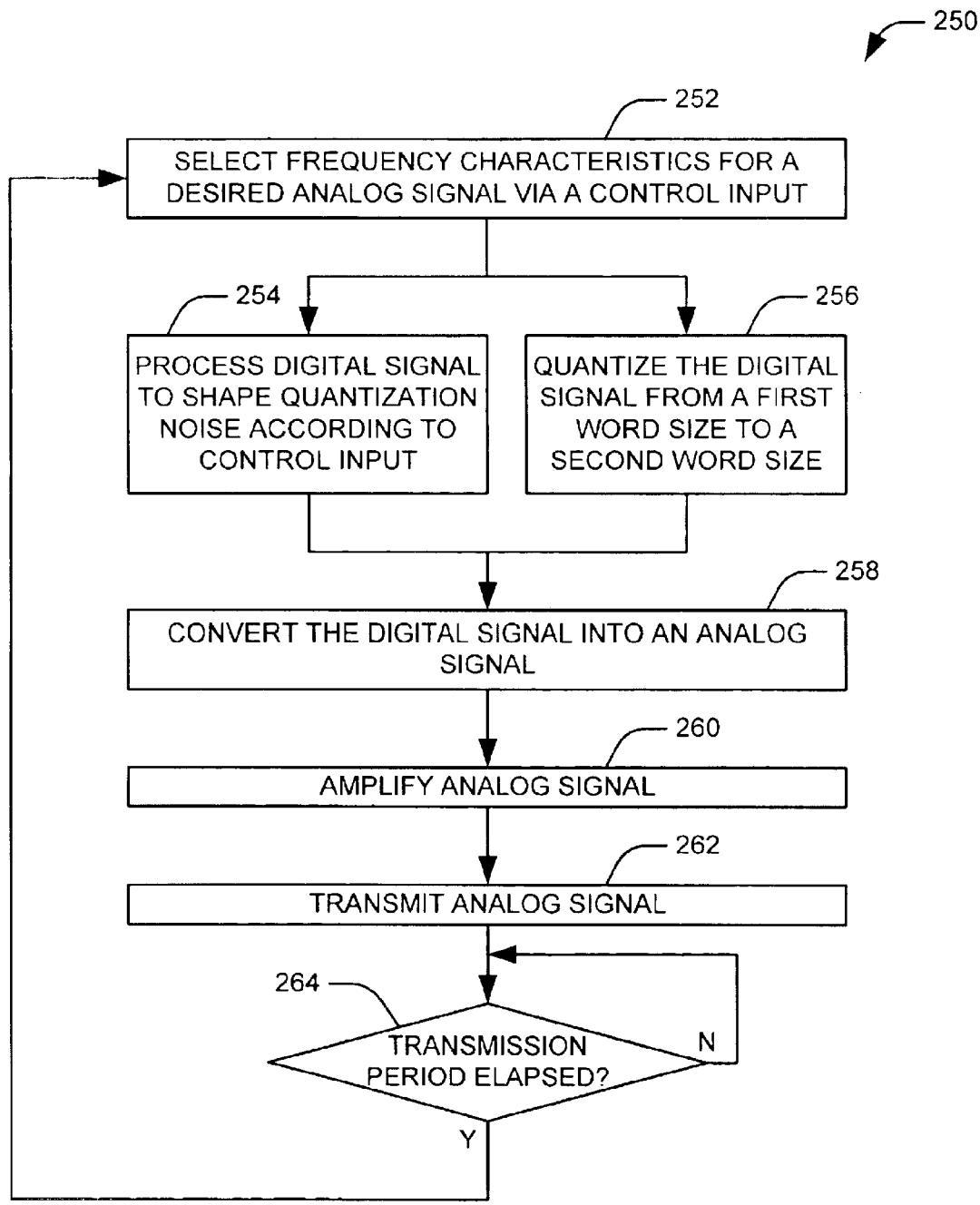
FIG. 6 illustrates a method for interdicting undesired communications over a range of frequencies.

In view of the examples shown and described above, methodologies in accordance with the present invention will be better appreciated with reference to the flow diagrams of FIGS. 5 and 6. While, for purposes of simplicity of explanation, the methodologies are shown and described as executing serially, it is to be understood and appreciated that the present invention is not limited by the order shown, as some aspects may, in accordance with the present invention, occur in different orders and/or concurrently from that shown and described herein. Moreover, not all features shown or described may be needed to implement a methodology in accordance with the present invention.

Additionally, such methodologies can be implemented in hardware (e.g., one or more integrated circuits), software (e.g., running on a DSP or ASIC) or a combination of hardware and software.

FIG. 5 illustrates a methodology 200 for evaluating one or more characteristics of a candidate amplifier. At 202, a control input is provided to select one or more frequency characteristics of a desired analog output signal. For example, the control input can specify the shape or center frequency of one or more low noise frequency bands associated with the analog signal. A digital input, having a first word size, is pre-processed at 204 to distribute quantization noise associated with a quantization process away from one or more comparatively narrow low noise frequency bands defined by the control input to one or more frequency ranges outside of the low noise frequency bands. It will be appreciated that this processing can precede the quantization of the signal. The digital input can include dither noise and/or one or more test signals.

The processed digital input is then quantized at 206 to reduce the digital input signal to a digital output signal having a second word size. In an exemplary embodiment, the second word size is one-bit. At 208, the digital output signal is converted into an analog signal. The analog signal includes one or more low noise frequency bands and a relatively large amount of quantization noise distributed across frequencies outside of the low noise frequency bands. In essence, the low noise frequency bands represent narrow notches in a wide band of quasi-random noise.

The analog signal is then filtered by a tunable filter at 210 in order to select a total bandwidth for the analog signal. For example, tunable filter can limit the bandwidth of the filter to a maximum bandwidth associated with the candidate amplifier. The tunable filter includes one or more passbands, having associated widths and center frequencies, that are electrically selectable according to the control signal. At 212, the analog signal is amplified at a candidate amplifier to produce an amplified signal. The amplified signal is analyzed at 214 to determine one or more characteristics of the amplifier.

For example, the linearity of the candidate amplifier can be evaluated. The power level of the amplified signal can be measured at one of the low noise regions to determine the linearity of the candidate amplifier. An intermodulation distortion property can also be measured in accordance with the illustrated methodology 200. A test carrier signal can be located in one of the low noise frequency bands and provided to the amplifier. The high level of noise in frequencies surrounding the low noise frequency band simulates the presence of a large number of additional carrier signals in neighboring frequencies. A spectral regrowth associated with the candidate amplifier can be measured as the ACPR.

FIG. 6 illustrates a methodology 250 for interdicting undesired communications over a range of frequencies. At 252, a control input is provided selecting one or more frequency characteristics of a desired analog output signal. For example, the control input can specify the shape or center frequency of one or more low noise frequency bands associated with the signal. A digital input, having a first word size, is pre-processed at 254 to distribute quantization noise associated with a quantization process away from one or more comparatively narrow low noise frequency bands defined by the control input to one or more frequency ranges outside of the low noise frequency bands. It will be appreciated that this processing can precede the quantization of the signal. The digital input can include dither noise and/or one or more desired signals for transmission.

The processed digital input is then quantized at 256 to reduce the digital input signal to a digital output signal having a second word size. In an exemplary embodiment, the second word size is one-bit. At 258, the digital output signal is converted into an analog signal. The analog signal includes one or more low noise frequency bands and a large amount of quantization noise distributed across frequencies outside of the low noise frequency bands. In essence, the low noise frequency bands represent narrow notches in a wide band of quasi-random noise.

The analog input is then amplified at 260, and the amplified signal transmitted at 262. The transmitted signal contains a large amount of quantization noise distributed across a frequency range and one or more low noise frequency bands within the quantization noise. The transmitted signal effectively interdicts signals outside of the low noise frequency bands, while allowing desired communication to proceed within the low noise bands. The transmitted signal can include one or more carrier signals within the low noise frequency bands, or external communications systems can take advantage of the low noise regions.

The center frequency and shape of the low noise frequency bands can be altered at periodic intervals to increase the security of any desired communications. The pattern of any such changes can be predetermined and provided to any external communications systems utilizing the low noise bands. At 264, it is determined if a predetermined transmission period has elapsed. If not, the methodology remains at 264 to await the end of the transmission period. When the period elapses, the methodology returns to 252 to select a new set of desired frequency characteristics for the analog signal.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A selective noise generation system, comprising:
   a delta-sigma modulator that receives digital input and produces a digital output;
   a digital-to-analog converter (DAC) that converts the digital output into an analog output comprising quasi-random noise having at least one low noise frequency band, the at least one low noise frequency band having respective associated shapes and center frequencies; and
   a frequency control that controls the delta-sigma modulator to alter one of the respective center frequency and the shape of the at least one low noise frequency band.

2. The system of claim 1, further comprising a frequency synthesizer that drives at least one of the delta-sigma modulator and the DAC, the frequency control controlling the frequency synthesizer to alter respective center frequencies of the at least one low noise frequency band associated with the analog output.

3. The system of claim 1, the delta-sigma modulator comprising at least one register and the frequency control being operative to alter at least one scalar value associated with the at least one register to change respective widths of the at least one low noise frequency band associated with the analog output.

4. The system of claim 1, the delta-sigma modulator comprising at least one register and the frequency control being operative to alter at least one scalar value associated with the at least one register to change the shape of the at least one low noise frequency band associated with the analog output.

5. The system of claim 1, further comprising a tunable filter having at least one passband having a center frequency, the frequency control being operative to vary the center frequency and the width of the at least one passband.

6. The system of claim 5, the tunable filter comprising a surface acoustic wave (SAW) filter.

7. The system of claim 5, the tunable filter comprising at least one micromechanical structure that can be electrically configured to change the center frequency of the at least one passband associated with the filter.

8. The system of claim 1, the analog output being a radio frequency signal.

9. The system of claim 1, the digital input comprising dither noise.

10. The system of claim 1, the digital input comprising at least one signal of interest.

11. An amplifier testing system comprising the noise generation system of claim 1.

12. The amplifier testing system of claim 11, further comprising:
    at least one amplifier that amplifies the analog output to provide an amplified signal; and
    a testing apparatus that analyzes the amplified signal at the at least one low noise frequency band to characterize the behavior of the amplifier.

13. The amplifier testing system of claim 12, the testing apparatus characterizing a linearity property associated with the at least one amplifier.

14. The amplifier testing system of claim 12, the analog output comprising at least one test carrier in the at least one low noise frequency band, and the testing apparatus characterizing an intermodulation distortion associated with the at least one amplifier.

15. The amplifier testing system of claim 14, the testing apparatus characterizing an adjacent channel power ratio associated with the at least one amplifier.

16. The amplifier testing system of claim 14, the testing apparatus further characterizing a linearity property associated with the at least one amplifier.

17. A transmitter assembly comprising the noise generation system of claim 1.

18. The assembly of claim 17, the analog output of the DAC comprising a radio frequency signal.

19. The assembly of claim 18, the transmitter comprising at least one amplifier that amplifies the radio frequency signal to provide an amplified signal.

20. The assembly of claim 19, the at least one amplifier comprising at least one switching amplifier.

21. The assembly of claim 17, the frequency control being operative to alter the center frequency of the at least one low noise frequency band in real time, and the transmitter employing a frequency hopping scheme for transmission.

22. An assembly, comprising:
    means for producing an analog signal comprising a wide frequency band of noise encompassing a low noise frequency band, having an associated shape and center frequency; and
    means for controlling the means for producing to alter the shape and center frequency of the low noise frequency band.

23. The assembly of claim 22, further comprising means for filtering the analog signal, the means having associated frequency characteristics, and the means for controlling being operative to alter the frequency characteristics of the means for filtering.

24. The assembly of claim 22, further comprising:
means for amplifying the analog signal to provide an amplified signal; and
means for evaluating the amplifier according to at least one characteristic of the amplified signal.

25. The assembly of claim 22, the means for producing an analog signal comprising means for providing a desired signal within the low noise frequency band.

26. The assembly of claim 22, further comprising means for transmitting the analog signal as a radio frequency signal.

27. A method of selectively generating noise within a frequency range, comprising:
quantizing a digital input, having a first word size, to produce a digital output signal having a second word size, the first word size being larger than the second word size;
processing the digital input as to distribute noise associated with quantizing the digital signal across the frequency range, such that the quantization noise is spread across at least one frequency band of quasi-random noise and is substantiality reduced in at least one low noise frequency band, the at least one low noise frequency band having associated frequency characteristics;
converting the quantized digital output signal into an analog signal; and
altering the frequency characteristics of the at least one low noise frequency band.

28. The method of claim 27, further comprising transmitting the analog signal, including the at least one frequency band of quasi-random noise.

29. The method of claim 28, further comprising providing at least one desired signal in the at least one low noise frequency band.

30. The method of claim 28, further comprising periodically altering the frequency characteristics of the at least one low noise frequency band during the transmitting of the analog signal.

31. The method of claim 27, further comprising:
amplifying the analog signal at a candidate amplifier to produce an amplified signal; and
evaluating the amplified signal to determine one or more characteristics of the candidate amplifier.

32. The method of claim 27, wherein evaluating the amplified signal includes determining a signal level associated with the at least one low noise frequency band.

33. The method of claim 27, wherein evaluating the amplified signal includes determining a noise power ratio between selected one of the at least one low noise frequency bands and a frequency band adjacent to the selected low noise frequency band.

34. The method of claim 27, wherein evaluating the amplified signal includes measuring a spectral regrowth of a desired signal within the at least one low noise frequency band.

* * * * *